(12) United States Patent
Bahman et al.

(10) Patent No.: US 11,492,018 B2
(45) Date of Patent: Nov. 8, 2022

(54) DOOR SYSTEM FOR A VACUUM TRAIN

(71) Applicant: SWISS TRANSPORTATION RESEARCH INSTITUTE AG, Küsnacht (CH)

(72) Inventors: Ramon Alexander Bahman, Küsnacht (CH); Aurelius Christian Bahman, Küsnacht (CH)

(73) Assignee: SWISS TRANSPORTATION RESEARCH INSTITUTE AG, Küsnacht (CH)

( * ) Notice: Subject to any disclaimer, the term of this patent is extended or adjusted under 35 U.S.C. 154(b) by 366 days.

(21) Appl. No.: 16/643,868

(22) PCT Filed: Sep. 15, 2017

(86) PCT No.: PCT/EP2017/073310
§ 371 (c)(1),
(2) Date: Mar. 3, 2020

(87) PCT Pub. No.: WO2019/052656
PCT Pub. Date: Mar. 21, 2019

(65) Prior Publication Data
US 2020/0189620 A1 Jun. 18, 2020

(51) Int. Cl.
B61B 13/10 (2006.01)
B61B 1/02 (2006.01)
B61D 19/02 (2006.01)

(52) U.S. Cl.
CPC .............. B61B 1/02 (2013.01); B61B 13/10 (2013.01); B61D 19/02 (2013.01)

(58) Field of Classification Search
CPC . B61B 1/02; B61B 13/10; B61D 19/02; E01F 1/00; F16J 15/46; E06B 7/2318; Y10S 277/926; B60J 10/244
See application file for complete search history.

(56) References Cited

U.S. PATENT DOCUMENTS 3,178,779 A * 4/1965 Clark ...................... B64C 1/14
                                                     220/232
3,325,042 A * 6/1967 Brown .................... F16J 15/46
                                                     220/232
(Continued)

FOREIGN PATENT DOCUMENTS

CN        104528376 A      4/2015
DE         2439032 A1      2/1976
(Continued)

OTHER PUBLICATIONS

International Search Report for corresponding international application No. PCT/EP2017/076622, dated May 24, 2018.

*Primary Examiner* — Mark T Le
(74) *Attorney, Agent, or Firm* — Leason Ellis LLP

(57) ABSTRACT

A door system for a vacuum train includes at least one vehicle with at least one vehicle door and a track including at least one evacuated pipe that guides and propels elements within the pipe. The track includes at least one station outside of the pipe with at least one station door arranged within the wall of the pipe to selectively close and open the station towards the pipe. The vehicle door and the station door being arranged in a corresponding position when the vehicle is at rest, so that persons can leave or enter the vehicle when the vehicle door and the station doors are open at the rest position. The door system comprises at least one inflatable ring shaped seal (22) which surrounds both doors when the doors are in their corresponding position and which seals in its inflated position both doors against the vacuum within the pipes.

7 Claims, 1 Drawing Sheet

(56) References Cited

U.S. PATENT DOCUMENTS

| | | | | |
|---|---|---|---|---|
| 3,840,208 A | * | 10/1974 | Schudel | F16K 1/228 |
| | | | | 251/173 |
| 4,441,278 A | * | 4/1984 | Covey, III | E06B 7/2318 |
| | | | | 49/477.1 |
| 4,804,173 A | | 2/1989 | Pol | |
| 5,282,424 A | * | 2/1994 | O'Neill | B61B 13/08 |
| | | | | 104/282 |
| 7,178,810 B1 | * | 2/2007 | Kuhary | F16J 15/061 |
| | | | | 277/921 |
| 2009/0102140 A1 | * | 4/2009 | Deaver | B60J 10/25 |
| | | | | 277/644 |
| 2018/0080564 A1 | * | 3/2018 | Tanner | F16J 15/027 |

FOREIGN PATENT DOCUMENTS

| | | |
|---|---|---|
| DE | 207878 A1 | 3/1984 |
| DE | 102005050829 A1 | 4/2007 |
| DE | 102010024321 A1 | 1/2011 |
| EP | 0872438 A1 | 10/1998 |
| EP | 1902815 A2 | 3/2008 |
| EP | 2143524 A1 | 1/2010 |
| EP | 2253422 A1 | 11/2010 |
| EP | 2660023 A2 | 11/2013 |
| EP | 2662182 A1 | 11/2013 |
| EP | 3025829 A1 | 6/2016 |
| WO | 2004028939 A2 | 4/2004 |
| WO | 2008139409 A2 | 11/2008 |
| WO | 2009051468 A1 | 4/2009 |
| WO | 2013080678 A1 | 6/2013 |

\* cited by examiner

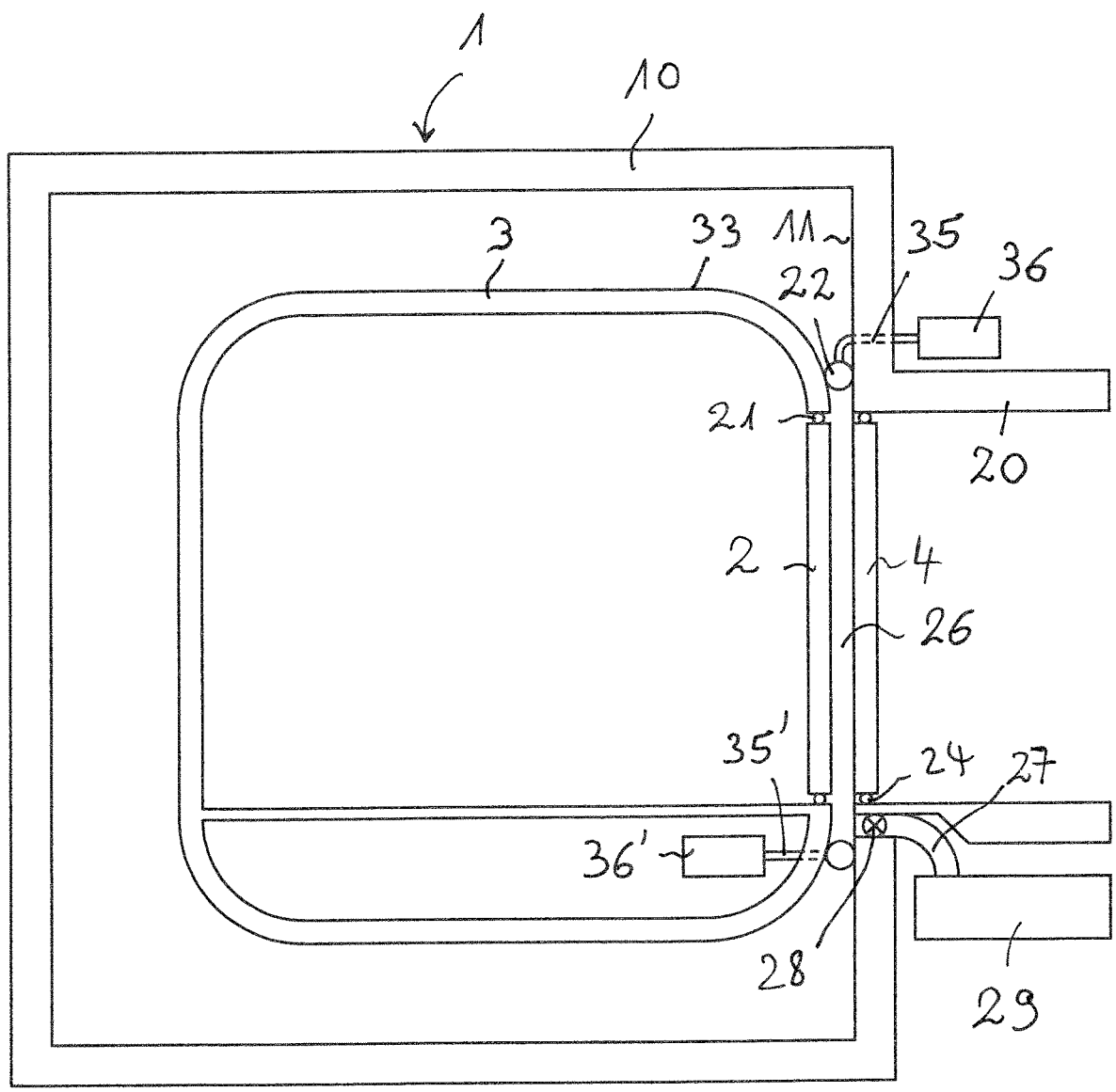

DOOR SYSTEM FOR A VACUUM TRAIN

CROSS-REFERENCE TO RELATED PATENT APPLICATIONS

This application is a U.S. National Stage Application under 35 U.S.C. § 371 of International Patent Application No. PCT/EP2017/073310, filed Sep. 15, 2017, which is incorporated by reference in its entirety. The International Application was published on Mar. 21, 2019, as International Publication No. WO 2019/052656 A1.

TECHNICAL FIELD

The invention relates to a door system for a vacuum train, wherein the vacuum train comprises at least one vehicle with at least one vehicle door and a track for the vehicle, which track comprises at least one evacuated pipe and/or tunnel for the vehicle and at least one station outside of said pipe and/or tunnel with at least one station door being arranged within the wall of the pipe and/or tunnel to selectively close and open the station towards the pipe and/or tunnel and the vehicle, and wherein the vehicle door and the station door are arranged to be in a corresponding position when the vehicle is at its rest position at the station, so that the vehicle is accessible when the vehicle door and the station door are open at the rest position of the vehicle. The invention further relates to a vacuum train with such a door system.

BACKGROUND ART

A Vacuum Train or Vactrain is basically a vehicle which runs in a pipe (or tunnel) from which the air has been partially or almost completely evacuated to reduce or to almost eliminate aerodynamic drag. With magnetic levitation (or similar means) for guiding and propelling of the vehicles of the vacuum train rolling resistance can also be eliminated. An outstanding performance and efficiency becomes possible. The cabin of the vehicle is obviously pressurised to a level which is comfortable for the passengers and crew (1.0 Bar). Swiss-metro and Hyperloop are the most prominent examples of the Vactrain concept.

The concept raises the question of how to get passengers and/or goods into the vehicles at the stations. The vacuum in the space between the vehicles and the walls of the pipes is an obstacle. It must be overcome to allow an easy, quick, safe and comfortable access to the vehicles at stations.

DISCLOSURE OF THE INVENTION

Hence, it is an object of the invention to provide a door system for a vacuum train. The door system shall allow for a swift opening of the doors of the vehicle and the doors of the station in order to minimize the time that the vehicle has to be at a standstill at the station, in particular at a standstill without allowing passengers and/or goods to enter or leave the vehicle.

This object is met by the door system according to the present disclosure comprising at least one inflatable and deflatable ring shaped seal which is positioned to surround both doors when the doors are in their corresponding position and which in its inflated state seals both doors and the space between them against the vacuum within the pipes and/or tunnels by filling the gap between the vehicle outer surface and the pipe and/or tunnel wall at the station and which does not fill the gap when being in its deflated state.

The inflatable and deflatable seal as claimed provides for a mechanically simple solution, essentially without moving parts for sealing, except for the expanding and contracting seal itself. This allows for a quick sealing action to isolate both doors from the vacuum within the pipe or tunnel. It also allows the positioning of the seal near to the doors of the vehicle and the station. Thereby the amount of air, which has to be introduced into the space between the doors resp. into the space between the vehicle and station before the corresponding doors can be opened can be minimized. And as well and very important, as explained below, it allows to minimize the time for removing the air from the sealed area between the doors resp. between the vehicle and the wall of the pipe after the doors have been closed. The ring shaped seal can be of circular or rectangular or quadratic ring shape. The cross section of the ring-shaped seals can be circular or may have a different shape, which is suited to their function. The material or the material combination from which the ring-shaped seal is made allows for an expansion to its inflated size and shape and for deflation. The seal may be made of reinforced rubber as for example known from automobile tyres and may additionally have an outer layer from a softer material, in particular a plastic material, which allows for a good sealing against the vehicle hull and the inside of the pipe or tunnel. It must be suitable for the given environment with vacuum and in particular shall not release gases and vapours into the vacuum. It may as well be possible to include a material improving the sealing properties on the hull of the vehicle and on the inside of the pipe or tunnel at the position where the ring-shaped seal will contact the hull and the inside of the pipe or tunnel in its inflated state, in order to improve the sealing contact of the ring-shaped seal with the vehicle and the pipe or tunnel. The contact areas on both the hull and the pipe/tunnel wall can also have a special shape or form eg. rills or grooves, respectively to enhance the sealing effect.

In a preferred embodiment the ring shaped seal is permanently arranged around the station door and is inflated and deflated by at least one fluid pump or at least one tank for compressed air or gas arranged outside of the pipe and/or tunnel. An alternative embodiment provides that the ring-shaped seal is permanently arranged around the vehicle door and is inflated and deflated by at least one fluid pump or at least one tank for compressed air or gas arranged within the vehicle. It is as well preferred that a ring shaped seal is provided both around the station door and around the vehicle door, the two ring shaped seals having different ring diameters, so that these seals form two consecutive sealing areas following each other in radial direction from the centre of the station door.

The ring shaped seal is preferably inflated pneumatically by a gas and deflated by removing the gas from the seal. The gas may be air or an inert gas or an air/inert gas mixture. As well the ring shaped seal may be inflated by a liquid and deflated by removing the liquid from the seal. The liquid may include a percentage of gas in order to improve the compressibility of the seal and thus to improve the sealing properties towards the vehicle hull and the inside of the pipe or tunnel.

Another object of the invention is to provide an improved vacuum train system.

This vacuum train system provides for the advantages explained before in connection with the door system.

BRIEF DESCRIPTION OF THE DRAWING

The above and other features and advantages of the present invention will become more apparent to those of ordinary skill in the art by describing in detail preferred embodiments thereof with reference to the attached drawing in which:

The FIGURE shows a schematic sectional view of an embodiment of a vacuum train with an example of the door system for the vacuum train.

MODES FOR CARRYING OUT THE INVENTION

An example of a vacuum train 1 is shown by the FIGURE in a vertical cross section view. A vacuum train comprises basically a vehicle and a track for the vehicle which is designed as a pipe (or tunnel) from which the air has been partially or completely evacuated to reduce or eliminate aerodynamic drag. With magnetic levitation (or similar means) rolling resistance can also be eliminated. An outstanding performance and efficiency becomes possible. The cabin of the vehicle is obviously pressurised to a level which is comfortable for the passengers and crew (1.0 Bar). A vacuum train is shown in a much simplified schematic view in order to explain the basic features. Accordingly, the vacuum train 1 includes at least one vehicle 3 with a passenger cabin 13.

This vehicle can be propelled and guided in the pipes or tunnel by a MAGLEV system (Magnetic Levitation system) or by any other suitable means. The MAGLEV system respectively the system for propulsion and guidance is not shown in the drawing. The present invention for the door system will work with any system. Together with the pipes and/or tunnels 10 in which the vehicle is travelling, the MAGLEV system resp. the system for propulsion and guidance forms the track of the vacuum train. At some points along the track there will be stations to allow passengers and goods to enter and exit the vehicles. To this end, doors 2 on the vehicle and doors 4 at the station are provided, which are only schematically indicated in the FIGURE. Obviously, at standstill at the station, the door or doors of the vehicle align with the door or doors of the station.

The vehicle remains in the vacuum of the pipes at the stations. According to the invention, the gap between the vehicle and the inside walls of the pipes is sealed off during the boarding process at each door by at least one inflatable seal to prevent air from the station to seep into the vacuum in the pipes. Doors permits short boarding processes and short standstill times at stations. This is an important physical consequence of the chosen construction as shown below.

The vehicle must wait in the station until the vacuum pressure between the vehicle door and the corresponding station door has been reduced to the low pressure or vacuum, respectively, in the pipes. The so-called pump down time t is defined by the following equation:

$$t = \frac{V}{S} \ln \frac{p_0}{p_1}$$

wherein
t is the pump-down time
V is the volume of air
S is the pumping speed
$p_0$, $p_1$ are the initial and the final pressure The design and underlying principles of the door system for the vacuum train according to the present invention is illustrated in the following by an example of the door system as shown in the FIGURE. It shows the vehicle 3 stopped so that its door 2 is exactly aligned with the door 4 of the station 20. This of course applies as well if there are several vehicle doors and several station doors. Around the door 2 of the vehicle, there is provided at least one vehicle door seal 21, which may be a pneumatically inflatable and deflatable seal or a fixed seal. As well around the station door 4 there is provided at least one station door seal 24, which may be a pneumatically inflatable and deflatable seal or a fixed seal. Around both doors 2 and 4 at least one inflatable and deflatable ring shaped seal 22 is provided, which is positioned to surround both doors when the doors are in their corresponding position and which in its inflated state as shown seals both doors and the space 26 between the doors against the vacuum within the pipe by filling the gap between the vehicle outer surface 33 and the inner pipe wall 11 at the station and which does not fill the gap when being in its deflated state.

The opening and closing of the doors of this door system is then done in the following steps 1 to 7 for opening the doors and steps 8 to 12 for closing the doors:

1. The pneumatic seal 21 on the perimeter of the vehicle door 2 of the vehicle 3 and the pneumatic seal 24 of the station door 4 of the station 20 are kept inflated respectively are kept sealed airtight whilst the vehicle is travelling.
2. When the vehicle 3 arrives at the station and has reached standstill position wherein the corresponding doors of the vehicle and the station correspond in position, the pneumatic seal 22 between the vehicle outer surface 33 and the wall 11 of the station is inflated. This will prevent air from seeping into the vacuum of the pipes when the doors are opened (step 6).
3. At this moment, there is still a vacuum in space 26 between doors 2 and 4. The atmospheric pressure in the vehicle and in the station (1.0 Bar) will create very large forces (ca. $2\times10^5$ N or 20 tons), which will push the doors towards each other and into their frames. It will be practically impossible to open the doors.
4. A valve 28 or valves, respectively within at least one pressure compensation duct 27 will be opened to let air into the space 26 between the doors, eliminating the vacuum within space 26 and the force on the doors.
5. The pneumatic seals 21 and 24 on the perimeter of the doors will be released.
6. The at least one door 2 of the vehicle and the at least one door 4 of the station will be opened. Very little force will be required to move them.
7. Passengers will now exit the vehicle and new passengers can enter freely.

Afterwards the closing of the doors can be done by the following steps:

8. The door 2 of the vehicle 3 and the door 4 of the station 20 are closed and the pneumatic seals 21, 24 on the perimeter around them are inflated resp. sealed. The pneumatic seal 22 between the vehicle and the station remains activated to prevent air from seeping into the vacuum of the pipes.
9. The air from space 26 between the doors 2 and 4 is evacuated by a vacuum pump 29. This may as well be done through the pressure compensation duct 27 as shown or through at least one separate duct. Valve 28 is then closed and kept closed to retain the same vacuum pressure as in the pipes. For this step, the following calculations would apply: The volume V of the space 26 between the doors will be in the magnitude of 0.2 m$^3$, assuming a surface area of the doors of 2 m$^2$ and a gap of 10 cm. With a pumping speed S of 300 m³/h (eg. using a Duo-255 rotary vane pump from Pfeiffer vacuum with 9.0 kW), and a final pressure $p_1$ of $10^{-1}$ mBar in the pipes, this will require a so-called pump-down time t of about 22 seconds according to the above equation.

10 The pneumatic seal 22 between the vehicle and the station is deflated and it is thus released from the hull 33 of the vehicle.

11 The vehicle can leave the station.

The (pneumatically) inflatable and deflatable seal 22 can be inflated by at least one pump 36 connected to the pneumatic seal 22 through channels 35 of which only one channel is indicated in the FIGURE. This applies to the embodiment wherein the pneumatic seal 22 is part of the station. In another embodiment the pneumatic seal 22 may be part of the vehicle 3 and in the FIGURE a pump 36' and one channel 35' are indicated at the vehicle below the passenger floor. In a preferred embodiment there may be one seal 22 being part of the vehicle and a larger ring-diameter seal 22 being part of the station, so that the two seals are nested one within the other and providing for a double sealing. Inflation of the at least one inflatable seal 22 can as well be done via a tank filled with compressed gas, in particular compressed air, instead of or in addition to a pump. Deflation of the at least one seal can be done via at least one valve (not shown) which opens up channels 35 and/or 35' so that the compressed gas within the seal will exit. Deflation can also be helped by at least one pump.

The invention shown here satisfies the requirements of a modern high-speed transportation system and allows much shorter standstill times than the concept of a so-called airlock. This is a chamber into which the vehicle is introduced after the boarding process has taken place in a station under normal atmospheric conditions. It is then sealed off at the ends and aligned with a select vacuum pipe (track), into which the vehicle is transferred for travel to its chosen destination. In this way, only the layer of air immediately surrounding the vehicle (t≈10 cm) has to be evacuated before the transfer.

Short standstill times at stations and especially at intermediate stations are needed to enable high average travel speeds between the start and final destination of a trip. The question of how to reduce the pump-down time and consequently also the stand-still time is best answered with the help of the equation shown before.

The first option for reducing the pump-down time and consequently the stand-still times at stations is to minimise the volume V, which has to be evacuated. The vacuum train doors capture an air volume, V, of 0.2 m³ between them and this only requires a pump-down time of about 22 seconds. This is a suitable match for the speed of a vacuum train. It can be 100 to 400 times quicker than the airlock solution shown above. As an option for the airlock solution, more pumps can be used but the total pumping speed will have to be increased by factor 100 respectively 400. This would be an unnecessary waste. The vacuum train door shown here is not only many times quicker. It would also be much simpler and much cheaper.

An increase of the vacuum pressure in the pipes is also certainly the wrong way to go. This will only increase aerodynamic resistance and reduce the speed of the vehicles. In addition, this will not change the pump-down time significantly. An increase in the pressure in the vacuum pipes from the lowest proposed value to the highest proposed value can only change the pump-down time by factor 5.0, because the term $\ln(p_0/p_1)$ in the equation only has range between 2.3 and 11.5 (pressure of $10^2$ mBar to $10^{-2}$ mBar).

Thus, a door system according to the present invention will be a necessity for vacuum trains. They offer short standstill times in the stations and contribute to the short overall travel times expected for vactrains.

Airlocks, on the other hand, make little or no sense, considering that vactrain doors according to the present invention are many times quicker and cheaper. They are too slow and do not match the speed requirements of vacuum trains.

The use of the airlock as a switch, whereby the vehicle is introduced into a pipe (track) corresponding to the desired destination, is also not feasible. The long pump-down times would lead to unacceptable waiting times, long intervals between departures, very low average speeds and a very low capacity.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention shall not be limited to the particular embodiments disclosed, but that the invention will include all embodiments falling within the scope of the appended claims.

The invention claimed is:

1. A door system for a vacuum train (1), wherein the vacuum train comprises at least one vehicle (3) with at least one vehicle door (2) and a track for the vehicle, which track comprises at least one evacuated pipe and/or tunnel (10) for the vehicle and at least one station (20) outside of said pipe and/or tunnel with at least one station door (4) being arranged within a wall of the pipe and/or tunnel to selectively close and open the station towards the pipe and/or tunnel and the vehicle, and wherein the vehicle door and the station door are arranged to be in a corresponding position when the vehicle is at its rest position at the station, so that the vehicle is accessible when the vehicle door and the station door are open at the rest position of the vehicle, and wherein the door system comprises at least one inflatable and deflatable ring shaped seal (22), which is positioned to surround both doors (2, 4) when the doors are in their corresponding position and which in its inflated state fills a gap between the vehicle outer surface (33) and the pipe and/or tunnel wall (11) at the station and seals both doors (2, 4) and the space (26) between the doors against the vacuum within the pipes and/or tunnels, and which inflatable and deflatable seal (22) does not fill the gap when being in its deflated state; and wherein the at least one inflatable and deflatable ring shaped seal include one ring shaped seal permanently arranged around the station door and inflatable by at least one fluid pump and/or by at least one tank for compressed gas arranged outside of the pipe and/or tunnel, and a second ring shaped seal is permanently arranged around the vehicle door and inflatable by at least one fluid pump arranged within the vehicle, and wherein the ring diameter of one of both seals is greater than the other, so that the seals located in the gap follow each other in radial direction from the center of the station door.

2. The door system according to claim 1 wherein the ring shaped seal (22) is deflatable by removing gas from the seal via at least one valve.

3. The door system according to claim 1 wherein the ring shaped seal is inflatable by a liquid and deflatable by removing the liquid from the seal.

4. The door system according to claim 1 wherein the material or material combination from which the ring shaped seal is made of includes reinforced rubber and additionally includes an outer layer of the seal including a plastic material allowing for an improved sealing of the ring shaped seal against a vehicle hull and the inside of the pipe or tunnel as compared to the rubber material.

5. The door system according to claim 1 wherein at least one vehicle door seal (21) is provided on the vehicle and wherein at least one station door seal (24) is provided at the station.

6. The door system according to claim 5 wherein the vehicle door seal is an inflatable and deflatable seal and/or the station door seal is an inflatable and deflatable seal.

7. A vacuum train (1) comprising at least one vehicle (3) with at least one vehicle door (2) and a track for the vehicle comprising at least one evacuated pipe and/or tunnel (10) for the vehicle, the track comprising at least one station (20) outside of said pipe and/or tunnel with at least one station door (4) being arranged within the wall of the pipe and/or tunnel to selectively close and open the station towards the pipe and/or tunnel, the vehicle door and the station door being arranged to be in a corresponding position when the vehicle is at rest at the station, so that the vehicle is accessible when the vehicle door and the station door are open at the rest position of the vehicle, and comprising a door system according to claim 1.

\* \* \* \* \*